(12) United States Patent
Taft

(10) Patent No.: US 7,778,738 B2
(45) Date of Patent: Aug. 17, 2010

(54) METHOD AND SYSTEM FOR REDUCING FEEDER CIRCUIT LOSS USING DEMAND RESPONSE

(75) Inventor: Jeffrey D. Taft, Canonsburg, PA (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

(21) Appl. No.: 12/378,128

(22) Filed: Feb. 11, 2009

(65) Prior Publication Data

US 2010/0138065 A1 Jun. 3, 2010

(51) Int. Cl.
G05D 5/00 (2006.01)
G05D 9/00 (2006.01)
G05D 11/00 (2006.01)
G05D 3/12 (2006.01)
G05D 23/00 (2006.01)
H02H 3/00 (2006.01)
H02H 7/00 (2006.01)

(52) U.S. Cl. .............. 700/295; 700/286; 700/291; 700/292; 700/297; 702/60; 702/61; 323/299; 323/304; 323/318; 361/4; 361/5

(58) Field of Classification Search .......... 700/286, 700/191–292, 295, 297; 702/60–62; 323/299, 323/304, 318; 361/4–5
See application file for complete search history.

(56) References Cited

U.S. PATENT DOCUMENTS

| | | | | |
|---|---|---|---|---|
| 3,947,728 | A * | 3/1976 | Smith | 361/76 |
| 4,935,642 | A * | 6/1990 | Obelode et al. | 307/32 |
| 5,526,034 | A * | 6/1996 | Hoarty et al. | 725/138 |
| 6,549,867 | B1 * | 4/2003 | Smith | 702/107 |
| 6,549,880 | B1 * | 4/2003 | Willoughby et al. | 703/13 |
| 2007/0043549 | A1 * | 2/2007 | Evans et al. | 703/18 |
| 2007/0285857 | A1 * | 12/2007 | Berkowitz et al. | 361/64 |
| 2008/0177678 | A1 | 7/2008 | Di Martini et al. | |
| 2009/0156409 | A1 * | 6/2009 | Hazelton et al. | 505/230 |

FOREIGN PATENT DOCUMENTS

EP 2 019 467 1/2009

OTHER PUBLICATIONS

International Search Report issued in PCT/US2009/000873 dated Dec. 21, 2009, (4 pgs).
Written Opinion issued in PCT/US2009/000873 dated Dec. 21, 2009 (7 pgs).

(Continued)

*Primary Examiner*—Ramesh B Patel
(74) *Attorney, Agent, or Firm*—Brinks Hofer Gilson & Lione

(57) ABSTRACT

A system and method that analyzes at least one aspect of the power grid for demand response in order to reduce feeder circuit losses is provided. The system and method may use a demand response model to select one or more factors for the demand response, such as selecting a subset of customers for demand response from a larger pool of available demand response customers. The demand response model may include a grid structure component, such as an indication of the particular customer's position in the grid and a dynamic operation component, such as a real-time measurement of current in the feeder circuit. By using the demand response model, feeder circuit losses may thereby reduced.

9 Claims, 4 Drawing Sheets

OTHER PUBLICATIONS

"Network Reconfiguration for Loss Minimization and Load Balancing", K. Nara et al., 2003 IEEE Power Engineering Society General Meeting. Conference Proceedings. Toronto, Ontario, Canada, Jul. 13-17, 2003, [IEEE Power Engineering Society], New York, NY: IEEE, US, vol. 4, Jul. 13, 2003, pp. 2413-2418, XP010685081; ISBN: 978-0-7803-7989-3.

"A New Approach for Feeder Reconfiguration to Minimize Distribution System Loss", M.Y. Cho et al., vol. 2, Sep. 5, 1993, pp. 596-600, XP010278909.

"LV and MV Distribution Networks Reconfiguration for Minimum Losses", W. Siti et al., 12th International Power Electronics and Motion Control Conference, IEEE, PI, Aug. 1, 2006, pp. 1478-1483, XP031009127, ISBN: 978-1-4244-0120-8.

* cited by examiner

METHOD AND SYSTEM FOR REDUCING FEEDER CIRCUIT LOSS USING DEMAND RESPONSE

BACKGROUND

1. Field of the Invention

The present invention relates generally to a system and method for reducing power loss in a power grid, and more particularly to a system and method for reducing power loss in a feeder circuit of a power grid by analyzing at least one aspect of demand response.

2. Related Art

A power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as 138K Volts). From a transmission substation, smaller transmission lines (such as sub-transmission lines) transmit the intermediate voltage to distribution substations. At the distribution substations, the intermediate voltage may be again stepped down to a "medium voltage" (such as from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as 120V). The consumer voltage may then be used by the consumer.

Distributing current through the power grid (such as through the electric power transmission, and electricity distribution) results in loss. Specifically, the loss, termed Joule heating (or resistive heating), occurs when the passage of an electric current through a conductor releases heat. The amount of loss is $I^2R$, where I is the current through the conductor and R is the resistance of the conductor. These losses in the power grid may be significant. It has been reported that transmission and distribution losses in the United States were estimated at 7.2% in 1995, and in the UK at 7.4% in 1998.

One type of analysis to reduce losses is a power flow study. A power flow study (also known as a load-flow study) involves a complex numerical analysis applied to a power system. The power flow study analyses the power systems in normal steady-state operation. There exist a number of software implementations of power flow studies. The goal of a power flow study is to obtain complete voltage angle and magnitude information for each bus in a power system for specified load and generator real power and voltage conditions. Once this information is known, real and reactive power flow on each branch as well as generator reactive power output can be analytically determined. Due to the nonlinear nature of this problem, numerical methods are employed to obtain a solution that is within an acceptable tolerance. The solution, however, requires complex iterative analysis and takes considerable time to solve. Therefore, a need clearly exists to provide a solution, which may be determined quickly and in real time, to reduce the losses due to Joule heating.

BRIEF SUMMARY

As discussed in the background of the invention, power grids lose a significant amount of power from distribution losses. One aspect of the invention includes providing a system and method that analyzes at least one aspect of the power grid for demand response in order to reduce distribution losses, such as losses in the feeder circuits of a power grid. Demand response is the ability to control loads at one or more customer sites, such as curtailing power used or starting on site generation. The system and method may select one or more factors for the demand response including: (1) selecting which customers for demand response (such as selecting a subset of customers for demand response from a larger pool of available demand response customers); (2) selecting an amount of demand response (such as determining how much demand response to select from the subset of customers selected); and (3) selecting a length of time for the demand response.

The method and system may be based on a demand response model, which may include: (1) a grid structure component; and (2) a dynamic operation component. The grid structure component may comprise an indication of the particular customer's position in the grid, such as the particular customer's position along a feeder circuit. For example, the grid structure component may comprise a weighting factor for the particular customer that reflects the particular customer's position in the feeder circuit, such as a weighting factor that is based on the distance of the customer from the substation. The grid structure component may account for the particular topology of the feeder circuit, such as whether the topology of the feeder circuit is a radial topology. Further, the grid structure component may be constant or dynamic. The structure of sections of the grid, such as a particular feeder circuit, may be constant over periods of time. So that, the grid structure component may be considered static over those periods of time. Because of this, the grid structure component may be pre-calculated and stored in a table. When the structure of the grid changes, such as when a particular feeder circuit is reconfigured, the grid structure component for the customers on the particular feeder circuit may be updated. Or, for feeder circuits that may dynamically change, the grid structure component may take into account the dynamic changes in the feeder circuit. For example, multiple feeder circuits (e.g., feeder circuit A and feeder circuit B) may have an inter-tie switch and sectionalizing switches. Depending on the switch states of certain switches (such as the inter-tie switch and/or the sectionalizing switches), sections of the feeder circuits may belong to feeder circuit A or feeder circuit B. The grid structure component may account for the states of the one or more switches in order to determine the weighting factors for customers on feeder circuit A or feeder circuit B.

The dynamic operation component of the demand response model may comprise a real-time measurement (such as the actual available capacity, the current flowing through one or more feeder circuits, distributed energy resource capacity (e.g., wind, solar, etc.). For example, the real-time current through a part of the feeder circuit may be determined, such as the real-time current from the substation to the feeder circuit, the real-time current at one or more customer premises, and/or the real time current from a sensor at a particular segment of the feeder circuit.

The specific weighting factor of the grid structure component for a particular customer may be combined with the real time measurement of the dynamic operation component associated with the particular customer to determine the "score" for the particular customer—in effect a measure indicative of the relative savings from feeder loss using demand response for a particular customer.

The demand response model may be based on estimates of current and/or resistance. Losses in the feeder circuits are $I^2R$, where I is the current through the feeder circuit and R is the resistance of the feeder circuit. An approximation for the resistance R may be based on the electrical distance from the substation. An approximation for the current may be based on the current to the feeder circuit (as measured at the substation). Specifically, it may be assumed that the feeder current decreases (such as decreasing exponentially) as a function of electrical distance from the substation. Given these estimates of resistance and current, the demand response model may allow for a more efficient selection of the subset of customers from the larger pool of demand response customers. Specifically, the larger pool of demand response customers may be large, even numbering in the millions. The demand response model does not require the solution of a large combinatorial problem, instead allowing for quicker execution of the determination of the subset of customers.

And, the demand response model may compare the benefit in terms of reduction in power loss at different points in the same feeder circuit and/or compare different points in different feeder circuits. In this way, this optimization using demand response may be performed across a section of a feeder circuit, across an entire feeder circuit, across different feeder circuits, and across an entire distribution grid.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS AND THE PRESENTLY PREFERRED EMBODIMENTS

Figure 1:
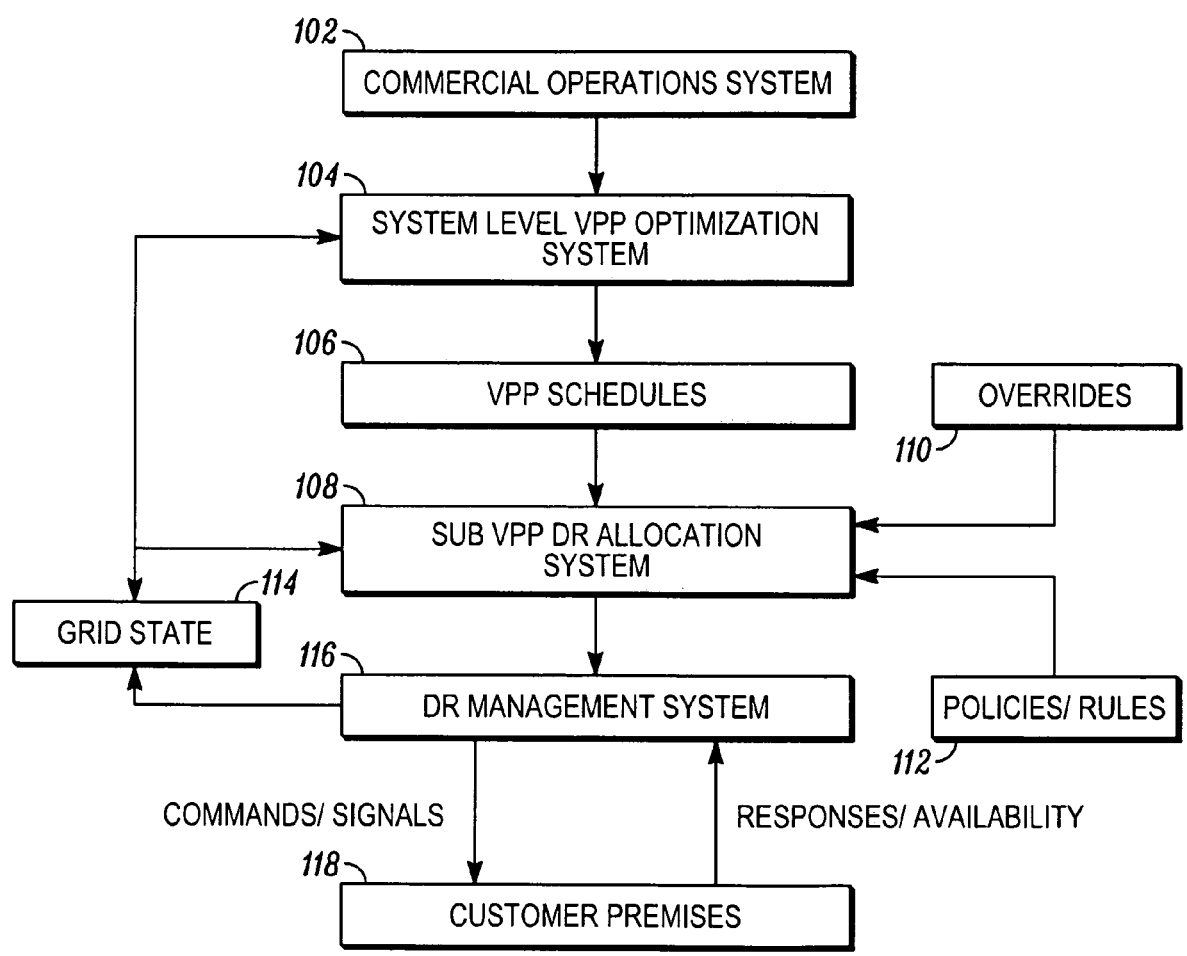
FIG. 1 is a block diagram of potential components in a demand response system.

Utilities typically have few options in attempting to reduce Joule heating loss in the power grid. One manner in which to reduce Joule heating loss as disclosed herein is by using demand response. Specifically, the preferred embodiments described below relate to using demand response to reduce loss in the power grid (such as in one or more feeder circuits in the power grid).

Demand response (DR), as a general matter, is the ability to control loads and/or control generation. Demand response may be used in power grids to manage customer consumption of electricity in response to supply conditions. The supply conditions may relate to reducing consumption at critical times, relate to changes in market prices (such as providing a pricing signal to the customer to indicate energy costs at different times), relate to changes in availability of energy (such as particular times when renewables, such as solar, are available), etc.

Thus, demand response may involve curtailing power used or by starting on site generation which may or may not be connected in parallel with the grid. Demand response schemes may be implemented with large commercial customers, often through the use of dedicated control systems to shed loads in response to a request by a utility or market price conditions. Services, such as lights, machines, air conditioning, may be reduced according to a load prioritization scheme during the critical timeframes. An alternative to load shedding may comprise on-site generation of electricity to supplement the power grid. Under conditions of tight electricity supply, demand response may significantly reduce the peak price and, in general, electricity price volatility.

Demand response is generally used to refer to mechanisms used to encourage consumers to reduce demand, thereby reducing the peak demand for electricity. Since electrical systems are generally sized to correspond to peak demand (plus margin for error and unforeseen events), lowering peak demand may reduce overall plant and capital cost requirements. Depending on the configuration of generation capacity, however, demand response may also be used to increase demand (load) at times of high production and low demand. Some systems may thereby encourage energy storage to arbitrage between periods of low and high demand (or low and high prices).

In the context of using demand response to reduce feeder circuit losses, demand response may reduce the amount of current that is required to be transmitted through the feeder circuits, thereby reducing the amount of Joule heating losses in the feeder circuits. The discussion below analyzes the selection of the specific demand response customers (from a larger pool of potential demand response customers). Specifically, the selection of the subset of specific demand response customers (from the larger pool of potential demand response customers) as detailed below may reduce the Joule heating losses more than a random selection of customers (from the larger pool of potential demand response customers).

Referring to FIG. 1, there is shown a block diagram 100 of an example of various components in a demand response system. The block diagram depicted in FIG. 1 is merely for illustration purposes. Different components may be present, such as disclosed in U.S. Provisional Ser. No. 61/127,294 filed on May 9, 2008 and U.S. Provisional Ser. No. 61/201,856 filed on Dec. 15, 2008. U.S. Provisional Ser. No. 61/127,294 filed on May 9, 2008 and U.S. Provisional Ser. No. 61/201,856 filed on Dec. 15, 2008 are both incorporated by reference herein in their entirety.

The demand response system may include a commercial operations system 102. The commercial operations system 102 may comprise a part of a utility that optimizes the generation portfolio. The commercial operations system 102 may address unit commitment, determining determine which generators, from a fleet of generators at a utility's disposal, to use to meet current load needs. Thus, the commercial operations system 102 may determine the various generators that are necessary to meet the load needs at peak times.

There are many examples of generators available at the disposal of the commercial operations system 102. Traditional generators may include coal-fired power plants, nuclear power plants, etc. Another type of "generator" that is available to the commercial operations system 102 may include demand response as a "virtual power plant" (VPP).

Though demand response does not generate any power, demand response reduces the amount of load, in effect generating the amount of power equal to the amount of load reduced. In other words, since demand response has the effect of reducing load, demand response has the effect of bringing about more generator capability.

The system level VPP optimization system 104 may determine, for the particular load at a particular time, the amount of power that needs to be "generated" by the VPP using demand response. Typically, demand response may request a specific amount of power (which may be measured in megawatts) to be reduced. For example, the system level VPP optimization system 104 may determine, for a peak load of 900 MWatts, that 150 MWatts of demand response is needed to reduce the actual load to 750 MWatts.

If the demand response capacity is larger than what is needed, then a subset of the customers within the demand response pool. The Sub VPP Allocation System 108 may select the subset of customers. For example, if the system level VPP optimization system 104 requests 150 MWatts in power reduction via demand response, and if the demand response capacity from the entire demand response pool is 300 MWatts, then less than all of the entire demand response pool may be needed. The Sub VPP Allocation System 108 may determine which customers, which are a subset of the entire demand response pool, may be selected in order to reduce the amount of losses in the feeder circuits. In the example given, if there are 1000 customers in the demand response pool, the Sub VPP Allocation System 108 may select the subset of the 1000 customers to meet the 150 MWatts in power reduction and reduces or minimizes the losses in the feeder circuits. There are a multitude of ways of obtaining the 150 MWatts in power reduction by selecting different subsets from the available pool of 300 MWatts. And, the Sub VPP Allocation System 108 may determine the amounts of power reduction from the subset of 100 customers to meet the 150 MWatts.

As shown in FIG. 1, the amount of power that needs to be "generated" using demand response is input to the Sub VPP Allocation System 108. As described below with respect to FIGS. 2 and 3, the Sub VPP Allocation System 108 may determine which customers (from the pool of available demand response customers) to select for demand response. The Sub VPP Allocation System 108 may also determine an amount of power to reduce from the customers selected. In addition to the input from the system level VPP optimization 104, the Sub VPP Allocation System 108 may receive other inputs including one or more VPP schedules 106 per VPP zones, the grid state 114 (such as providing various real-time aspects of the grid, including sensed current at one or more substations), policies or rules 112 set for demand response (such as customer agreements detailing how much/how often demand response may be performed), and various overrides 110.

After the Sub VPP Allocation System 108 determines which customers to select and an amount of power to reduce for the customers selected, the Sub VPP Allocation System 108 may send one or more signals to the DR Management System 116. The DR Management System 116 generates the signals to send to the customer premises in order to control load at the customer premises 118. Specifically, the DR Management System 116 may send commands/signals to the customer premises 118, and the customer premises 118 may send responses/availability to the DR Management System 116. Though FIG. 1 depicts customer premises 118 as a single block, signals from the DR Management System 116 may be sent individually to each of the customer premises 118 selected for demand response. For example, one or more customer premises may receive signals that control one or more devices at the customer premises.

As such, technologies may automate the process of demand response. Such technologies may detect the need for load shedding, communicate the demand to participating users, automate load shedding, and verify compliance with demand-response programs. Scalable and comprehensive software solutions for DR enable business and industry growth.

A utility may use an automated system, such as depicted in FIG. 1, connected to industrial, commercial and/or residential users that may reduce consumption at times (such as at times of peak demand), essentially delaying draw marginally. The automated system may turn down or off certain appliances or sinks (and, when demand is unexpectedly low, potentially increasing usage). For example, heating may be turned down or air conditioning or refrigeration may be turned up (turning up to a higher temperature thereby using less electricity), delaying slightly the draw until a peak in usage has passed. The grid may thus benefit by delaying peak demand (allowing peaking plants time to cycle up or avoiding peak events), and the participant benefits by delaying consumption until after peak demand periods, when pricing may be lower.

Figure 2:
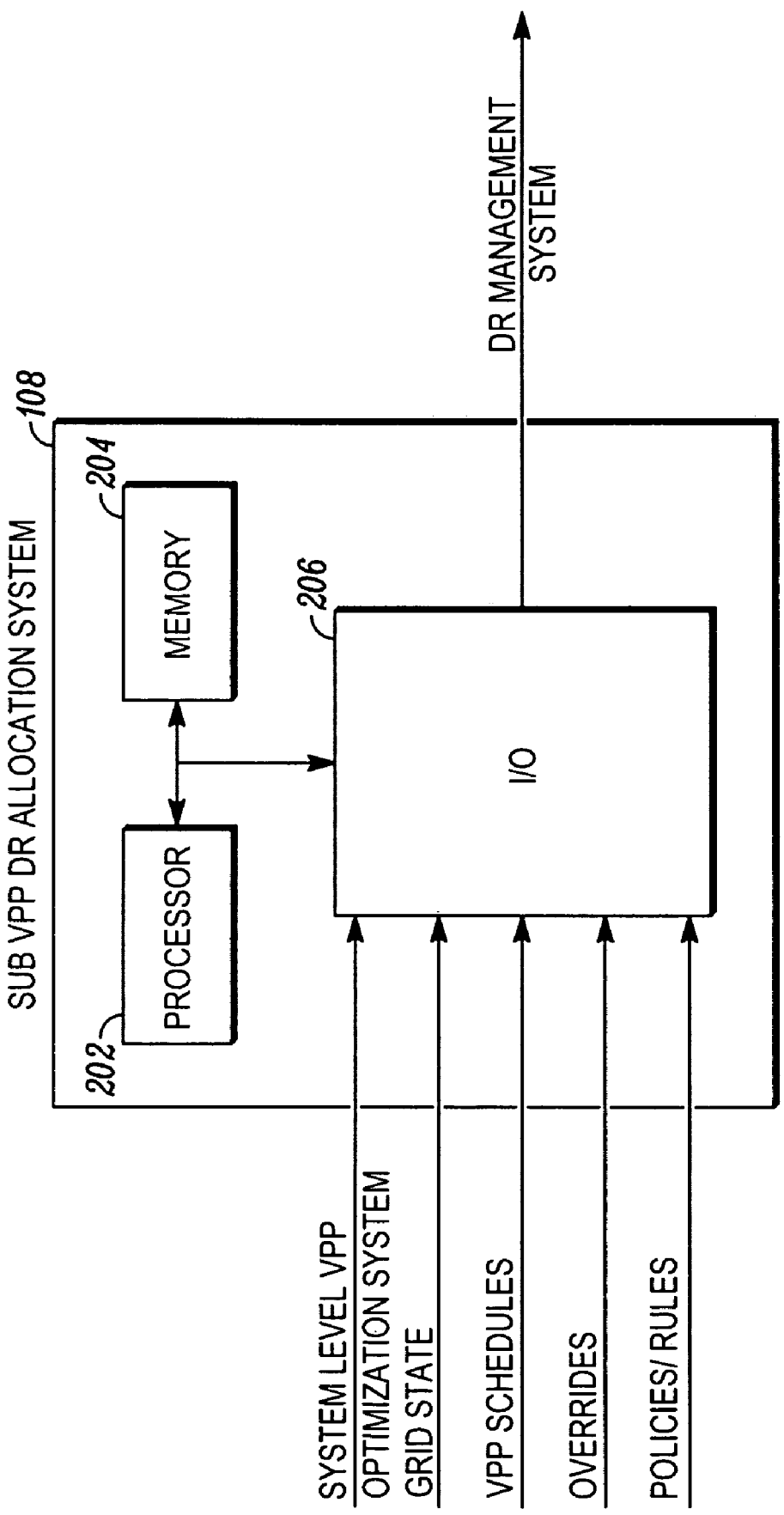
FIG. 2 shows a block diagram of the Sub VPP Allocation System as depicted in FIG. 1.

FIG. 2 shows a block diagram of the Sub VPP Allocation System 108. The Sub VPP Allocation System 108 may comprise a computer system that includes a processor 202 and a memory 204 that can communicate via a bus. The memory 204 may include volatile and/or non-volatile memory, and may include one or more programs. The memory 204 may be a main memory, a static memory, or a dynamic memory. The memory 204 may include, but may not be limited to, computer-readable storage media such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one case, the memory 204 may include a cache or random access memory for the processor 202. Alternatively or in addition, the memory 204 may be separate from the processor 202, such as a cache memory of a processor, the system memory, or other memory. The memory 204 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 204 may be operable to store instructions executable by the processor 202. The functions, acts or tasks illustrated in the figures (such as FIG. 3) or described herein may be performed by the programmed processor 202 executing the instructions stored in the memory 204. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system for the Sub VPP Allocation System 108 may further include a display, such as a liquid crystal display (LCD), an organic light emitting diode (OLED), a flat panel display, a solid state display, a cathode ray tube (CRT), a projector, a printer or other now known or later-developed display device for outputting determined information. The display may act as an interface for the user to see the functioning of the processor 202, or specifically as an interface with the software stored in the memory 204 or in the drive unit.

Additionally, the computer system for the Sub VPP Allocation System 108 may include an input device configured to allow a user to interact with any of the components of system. The input device may be a number pad, a keyboard, or a cursor control device, such as a mouse, or a joystick, touch screen display, remote control or any other device operative to interact with the system.

The computer system for the Sub VPP Allocation System 108 may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory 204 and/or within the processor 202 during execution by the computer system. The memory 204 and the processor 202 also may include computer-readable media as discussed above.

The present disclosure contemplates a computer-readable medium that includes instructions or receives and executes instructions responsive to a propagated signal. The instructions may be implemented with hardware, software and/or firmware, or any combination thereof. Further, the instructions may be transmitted or received over the network via a communication interface. The communication interface may be a part of the processor 202 or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly.

For example, the instructions to perform the actions illustrated in FIG. 3 (described below) may be included in the memory 204. Further, the DR model (discussed below) may be included in memory 204. The processor 202 may execute the programs in memory 204, and may receive inputs and send outputs via I/O 206, as shown in FIG. 2.

The DR model may be based on an analysis of how much effect on losses a given demand response capacity will provide. Specifically, the DR model may determine the effect, in terms of reduction in feeder circuit loss, for a given demand response (such as the reduction in feeder circuit loss for a particular candidate in the demand response pool). The DR model's determination may be based on a variety of factors including: (1) the amount of load; (2) where it is located in the grid; and (3) how much current is running through that portion of the grid (such as the amount of current running through the particular feeder circuit).

Given that the demand response pool may number in the millions of customers, the DR model and the below analysis allows for a quick execution of the determination of the subset of customers. The DR model discussed below does not require the solution of a large combinatorial problem. Specifically, the DR model does not require examination of all of the possible combinations of using 1 home, 2 homes, 3 homes, etc (up to a million homes in a pool of a million customers). Rather, the DR model may be composed of two sections: (1) a grid structure component; and (2) a dynamic operation component. The grid structure component may comprise a weighting factor based on the sensitivity equation (an example of which is disclosed below). Each of the available customers in the pool of a million customers may have a specific weighting factor associated with it. In this way, a set of weights may be pre-determined for one, some, or all of the customers in the demand response pool. The grid structure component may be considered static in nature. Specifically, since the grid structure component is an indication of the grid structure, such as a particular feeder circuit, the grid structure component may be considered static. When the grid structure is changed, such as a revision of the layout of the feeder circuit, the grid structure component may be updated, such as the grid structure component for the customers on the revised feeder circuit.

And, the dynamic operation component may comprise a real-time measurement (such as the actual available capacity, the current flowing through the feeder circuit, distributed energy resource capacity (e.g., wind, solar, etc.). The specific weighting factor for a particular customer may be combined with the real time measurement associated with the particular customer to determine the "score" for the particular customer—in effect a measure indicative of the relative savings from feeder loss for a particular customer. As shown below combining the weighting factor with the real time measurement may comprise a simple mathematical operation. So that, this simple mathematical operation may be performed for each of customers in the entire pool of available customers, and the "scores" for the customers may be compared (such as by ranking) to determine which of the available customers to select.

Figure 3:
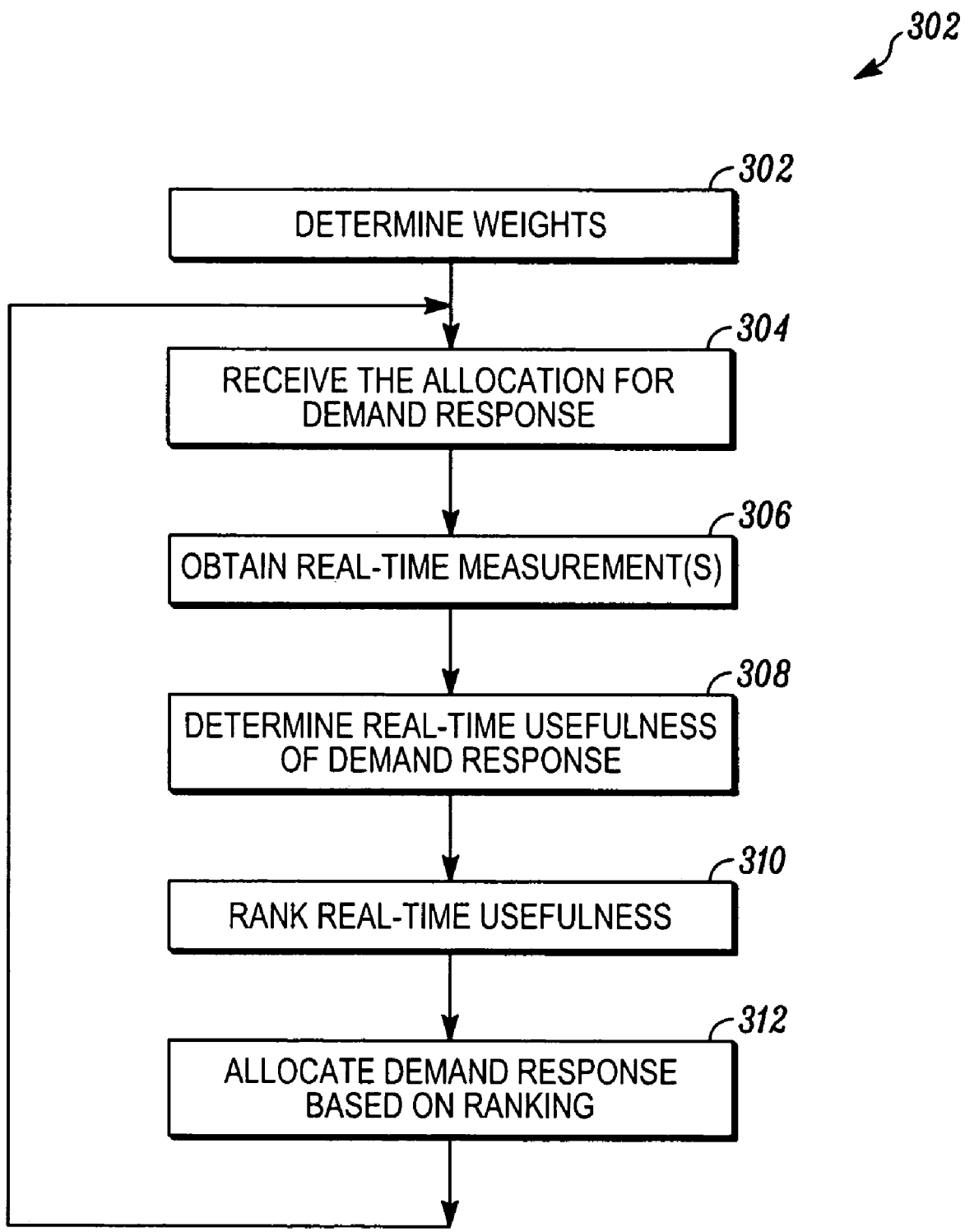
FIG. 3 is an example of a flow diagram for selecting a subset of customers for demand response from the pool of available demand response customers.

As shown in the flow chart 300 in FIG. 3, the weight factors may be determined (block 302). As discussed above, the weight factors are the static portion of the DR model. In the event that a portion of the grid is modified, such as changing a feeder circuit, the weight factors for one or more customers may need to be modified. At runtime, the allocation for the demand response may be received from the system level VPP optimization system, as shown at block 304. And, real time measurement(s) may be received, as shown at block 306. The real time measurement may comprise the amount of current that is flowing in a particular feeder circuit. As discussed in more detail below, the sensors necessary to determine the real-time usefulness for one or more customers in the demand response pool may comprise sensors at the substation. In this way, additional sensors in various other sections of the feeder circuit are not required.

The weighting factors may be combined with the real time measurements to obtain a sensitivity value. As discussed below, the weighting factor may comprise $S[1-e^{-S_0/S}]$ and the real time measurement may comprise $I_0$ (the current to the particular feeder circuit as sensed at the substation). The weighting factor and the real time measurement may be multiplied together to obtain the sensitivity value.

The sensitivity value may then be multiplied by the amount of available demand response capacity from the particular home in order to determine the usefulness for using demand response for a particular customer. Thus, an indicator of the usefulness in terms of reducing feeder circuit loss may be determined for one, some, or all of the customers in the demand response pool, as shown at block 308. In this way, at runtime, the weights may be combined with real-time data and available demand response in order to determine the usefulness (in terms of reduction in feeder circuit losses) for a particular demand response customer for that particular time. The usefulness is thus an indicator of reduction in feeder circuit losses.

The usefulness for one, some, or all of the customers in the demand response pool may be ranked, as shown at block 310.

For example, the demand response pool may be ranked, with the highest rank going to the customer with the greatest usefulness in terms of reduction in feeder circuit losses, then the next highest rank going to the customer with the second greatest usefulness, etc. And, the system may allocate the required demand response based on the ranking, as shown at block 312. For example, by starting with the highest ranked—or greatest usefulness in reduction of feeder circuit losses—and working down the sorted list until the demand response allocation is met.

Below is a mathematical discussion of the analysis. The mathematical discussion is for illustrative purposes only. As discussed above, the losses in the feeder circuits are $I^2R$, where I is the current through the feeder circuit and R is the resistance of the feeder circuit. One difficulty in the analysis is determining "R" or resistance in the feeder circuit. One manner to determine "R" may include installing instrumentation on the feeder circuit lines. An alternative (and more cost effective) solution to determining "R" is to estimate that the resistance "seen" by any potential demand response customer is approximately proportional to its electrical distance of the potential demand response customer from the substation. The exact amount of resistance may thus not need to be determined; instead, an approximation of the resistance may be determined. In this way, the position of the potential demand response customer in the grid may be accounted for without the need for additional costly instrumentation in the grid.

Another difficulty in the analysis is determining the current distribution in the feeder circuit. As discussed above, instrumentation at the substation may sense the amount of current that is flowing to a particular feeder circuit. As one moves away from the substation, various loads tap current along the way so that the current drops farther away from the substation. The specific current distribution as a function of distance from the substation depends on the exact function and nature of the loads in the feeder circuit. Again, rather than having instrumentation at various portions of the feeder circuit to determine the specific current distribution, one or more approximation methods may be used. For example, an exponential function as a function of distance may be used to approximate the current distribution.

In the instance of allocating demand response per feeder, several factors may be accounted for including: preference for feeders with the highest demand (or current); and preference for load furthest from the substation. In this way, the usefulness of the demand response may account for both position on the feeder and the feeder loading.

Figure 4:
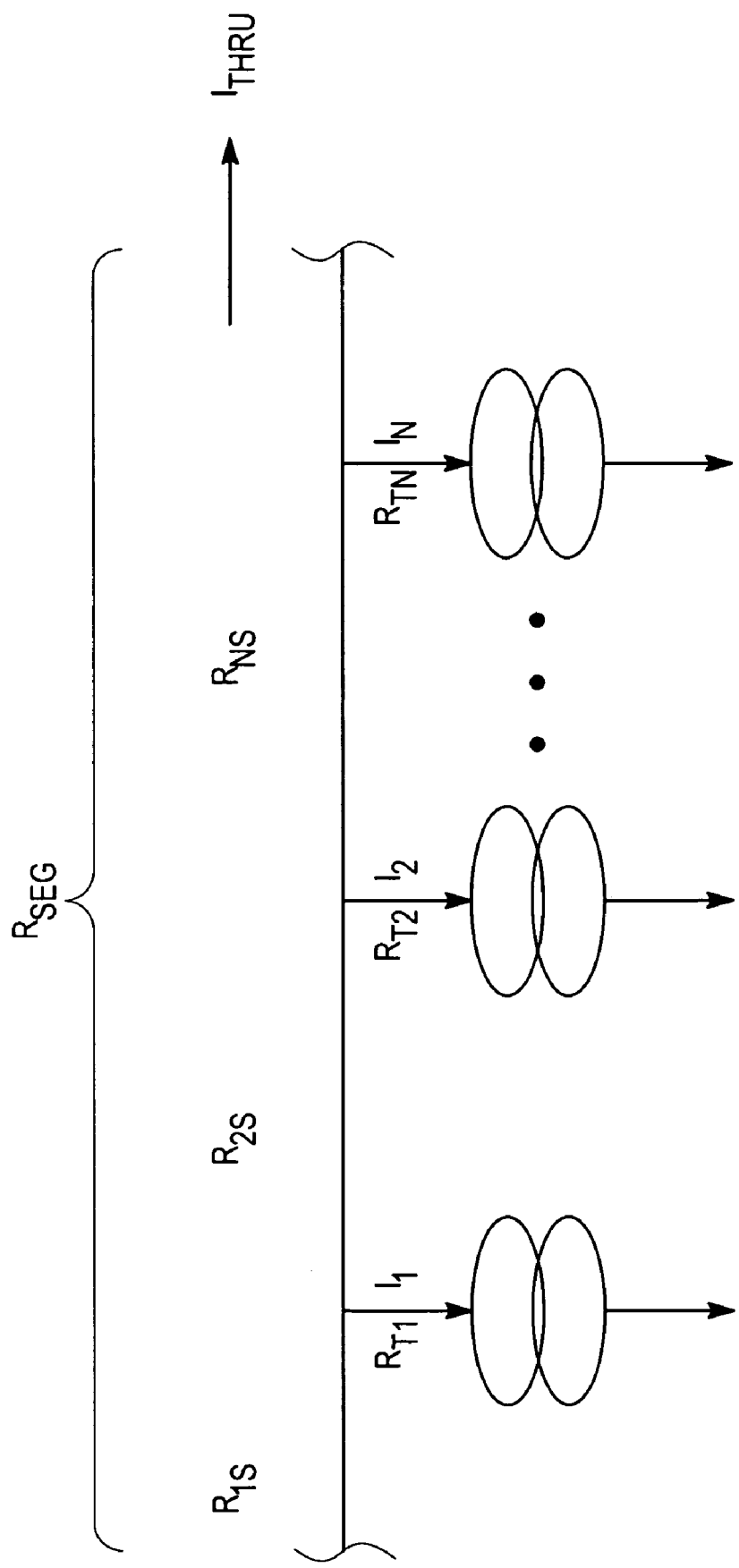
FIG. 4 is a representation of the losses in a feeder circuit.

The power loss, $P_T$, may be derived from the feeder circuit model shown in FIG. 4, and represent an example of the power loss in a feeder circuit. Specifically, FIG. 4 illustrates resistance $R_{SEG}$, various resistance segments ($R_{1S}$, $R_{2S}$, and $R_{NS}$), local segments resistances (such as $R_{T1}$, $R_{T2}$, and $R_{TN}$), and local segments currents (such as $I_1$, $I_2$, and $I_N$). A general equation for modeling feeder losses is shown below:

$$P_T = R_k \sum_{k=0}^{m} I_{thru}^2(k) - R_k \sum_{k=0}^{m} \left[ I_{thru}(k) - \frac{D(m)}{V_{sec}(m)} \right]^2 + \quad [1\text{-}1]$$

$$R_B \sum_{k=0}^{m+1} I_{thru}^2(k) - R_k \sum_{k=0}^{m+1} \left[ I_{thru}(B) - \frac{D(m+1)}{V_{sec}(m+1)} \right]^2$$

where $R_k$ is the section k resistance, $V_{sec}$=Secondary voltage at segment k, D=Section negawatts (or negative megawatts applied to the system). In analyzing the above-equation, the following is determined: (1) DR further from substation counts for more per kilowatt than closer to the substation; (2) real-time topology matters (see (1)); (3) segment through current matters; and (4) phase matters, so that ranking should be per feeder phase.

Further, as discussed above, an approximation for the indication of the resistance (R) is electrical distance from the substation. This approximation is based on the assumption that a given piece of wire has a certain amount of resistance. If the wire is reduced in size to a very small amount (such as a particular unit length), it may be seen as an elemental section of the wire. The elemental section of the wire has a particular amount of resistance (i.e., a particular amount of resistance per the particular unit length such as $\Omega$/inch). Given this, if one seeks to determine the resistance of a long wire, the distance of the wire may be multiplied by the particular amount of resistance per unit length to approximate the resistance of the wire. This approximately is suitable for a particular wire if the cross-section is relatively constant and if the same material is used for the length of the particular wire. So that, length may be an indicator of the resistance when examining distributed resistances.

$$P_{LS} = \sum_{k=0}^{m} R_k * I_{thru}^2(k) - \sum_{k=0}^{m} R_k \left[ I_{thru}(k) - \sum_{l=k}^{m} \frac{D(l)}{V_{sec}(l)} \right]^2 \quad [1\text{-}2]$$

where $P_{LS}$=reduction in feeder loss power due to invoking demand response,
$R_k$=magnitude of resistance of segment R
$I_{thru}(k)$=through current at segment k
$D(l)$=actual demand response at segment l
$V_{sec}(l)$=secondary voltage at segment l
m=last segment with Demand Response.

The following equation may be derived from equation [1-2]

$$\frac{\partial P_{LS}}{\partial D(l_0)} = \frac{2}{V_{sec}(l_0)} \sum_{k=0}^{m} R_k \left[ I_{thru}(k) - \sum_{\substack{l=k \\ l \neq l_0}}^{m} \frac{D(l)}{V_{sec}(l)} \right]^2 \quad [1\text{-}3]$$

If one focuses on only one demand response unit ($l_0$), then $$\frac{\partial P_{LS}}{\partial D(l_0)} = \frac{2}{V_{sec}(l_0)} \sum_{k=0}^{l_0} \{ R_k * I_{thru}(k) \} \quad [1\text{-}4]$$

Let $\gamma(s) = \frac{\partial R}{\partial s}$, where S = electrical distance, then $$\frac{\partial P_{LS}}{\partial D(s_0)} = \frac{2}{V_{sec}(s_0)} \int_0^{s_0} \gamma(s) * I_{thru}(s) \, ds \quad [1\text{-}5]$$

$P_{LS}$ requires knowledge of feeder current at each segment:

$$P_{LS} = \sum_{k=0}^{m} \{ R_k * I_{thru}^2(k) \} - \sum_{k=0}^{m} \left\{ R_k * \left[ I_{thru}(k) - \sum_{l=k}^{m} \frac{D(l)}{V_{sec}(l)} \right]^2 \right\} \quad [1\text{-}6]$$

where $I_{thru}$ is the feeder current at a segment in the feeder circuit. The feeder current (or an indication of it) may be determined in several ways. A first way is to place sensors at each of the segments in the feeder circuit in order to measure the current in the respective segment. A second way (not requiring installation of sensors on the line is using meter data at the customers' premises (such as in an AMI system). Specifically, if only meter data is available:

$$I_{thru}(k) = I_{substation} - \sum_{l=k+1}^{K} \left[ \frac{D(l)}{V_{sec}(l)} \right], \quad [1\text{-}7]$$

where D(l)=total demand at segment l which is $$D(l) = \sum_{m=0}^{M-1} MD(m); \quad [1\text{-}8]$$

MD(m)=meter demand at meter m of the segment. Therefore:

$$I_{thru}(k) = I_{substation} - \sum_{l=k+1}^{K} \sum_{m=0}^{M-1} \frac{MD(l,m)}{V_{sec}(l,m)} \quad [1\text{-}9]$$

If this is rolled up from the end segment back toward the substation:

$$I_{thru}(R) = I_{substation} - \underbrace{\sum_{l=k+1}^{K} I_{thru}(l)}_{\substack{\text{downstream} \\ \text{segment} \\ \text{through} \\ \text{currents}}} - \underbrace{\sum_{m=0}^{M-1} \frac{MD(k,m)}{V_{sec}(k,m)}}_{\substack{\text{local segment} \\ \text{load current} \\ \text{equivalent}}} \quad [1\text{-}10]$$

The current for k next to end segment is:

$$I_{end} = \sum_{m=0}^{M-1} \frac{MD(m)}{V_{sec}(m)}; \quad [1\text{-}11]$$

where MD is from the actual end segment.

A third way to approximate feeder current in the feeder segments of the feeder circuit may be based on the feeder current in the substation. As background, it may be assumed that as the current travels from the substation, it decreases due to customers along the way from the substation tapping the current (and may be assumed to decrease monotonically in an ordinary grid system). The precise current in a feeder circuit is dependent on the nature of the loads and where they are connected. And, because the loads are switching on and off, the precise current in a particular feeder segment changes over time.

Given this, it may be assumed that the feeder current decreases exponentially as a function of electrical distance from the substation. In effect, the current follows an exponential decay model as it moves further away from the substation. Mathematically, this approximation may take the form of $$I(s) = I_0 e^{-s/S},$$

where s is the electrical distance of the wire (the actual wire length, such as including the curves in the wire), and where S is a parameter that characterizes resistance as a function of distance along the feeder circuit.

Given this approximation for the feeder current in the segment and given the approximation for resistance (described above as being proportional to its electrical distance of the potential demand response customer from the substation), then equation [1-5] may be modified as follows:

$$\frac{\partial P_{LS}}{\partial DR(S_0)} = \frac{2k}{V_{sec}(S_0)} \int_0^{S_0} I_{thru}(s) \, ds \quad [1\text{-}12]$$

$$\text{Replace } \frac{2k}{V_{sec}(s_0)} \text{ by } 1; \frac{\partial P'_{LS}}{dDR(s_0)} = \int_0^{S_0} I_{thru}(s) \, ds \quad [1\text{-}13]$$

then approximate $I(s) = I_0 e^{-s/S}$; then $$\frac{\partial P_{LS}}{\partial DR(S_0)} = \int_0^{S_0} I_0 e^{-s/S} \, ds \quad [1\text{-}15]$$

$$= I_0(-S)e^{-s/S} \big|_0^{S_0}$$

$$= [I_0 e^{-S_0/S} - I_0](-S)$$

$$= I_0[e^{-S_0/S} - 1][-S]$$

$$\frac{\partial P_{LS}}{\partial DR(s_0)} = -SI_0[e^{-S_0/S} - 1] = SI_0[1 - e^{-S_0/S}] \quad [1\text{-}16]$$

where $I_0$ is the feeder current at the substation, and where $S[1-e^{-S_0/S}]$ is the feeder load distribution parameter.

$S[1-e^{-S_0/S}]$ may be a weighting factor in the DR model, and may be pre-calculated for one, some or for every customer. S is a parameter that characterizes resistance as a function of distance along the feeder circuit. An example of S may comprise 5 times the length of the entire distance of the feeder circuit. $S_0$ is an indication of the location of the particular demand response point along the feeder circuit (e.g., the electrical distance of a particular customer from the substation). So that the term $S[1-e^{-S_0/S}]$ may account for the static factors for the particular demand response point in the feeder circuit. Then, $I_0$ may be applied (as the dynamic component in the DR model) at the requested time in order to determine the amount of savings for a particular demand response point.

For a power grid with multiple feeder circuits, the weighting factor may be tailored for customers on different feeder circuits. Specifically, the term $S[1-e^{-S_0/S}]$ includes the term S, which may characterize the resistance as a function of distance for a particular feeder circuit. For example, a first feeder circuit may have one value for S (such as $S_1$) and a second feeder circuit may have one value for S (such as $S_2$). Further, the electrical distance $S_0$ for customers in the various feeder circuits may be determined. For example, the electrical distance $S_0$ for one, some or all of the customers in the first feeder circuit may be determined. In practice, the electrical distance $S_0$ may be different for different customers in a specific feeder circuit.

Further, the weighting factor may be tailored for different topologies of feeder circuits. For example, a feeder circuit with a radial topology may use the term $S[1-e^{-S_0/S}]$ as a weighting factor. As another example, a feeder circuit may have one or more laterals emanating from the feeder circuit. A lateral is a circuit emanating from a main branch of the feeder circuit (or a backbone circuit) that carries less current than the main branch. For purposes of the weighting factor, the electrical distance $S_0$ for a customer on a lateral of the feeder circuit may be estimated to be the electrical distance from the substation to the point at which the lateral branches off from the main branch. This estimate is based on the current in the lateral being lower than the current in the main branch, so that losses for current flowing in the lateral may be discounted. Alternatively, for laterals that carry significant current, the distance the current travels on the lateral may be accounted for in the model.

As still another example, a feeder circuit may have one or more branches. The current in the branch may be less than the current in the main branch of the feeder circuit. Further, the weighting factor may be determined at various demand response points, such as before the branch point or in the one or more branches. For example, for any of demand response points that fall in between the substation and the first branch point, the weighting factor may be the same as that for a simple radial topology. Specifically, the model may be as follows: $S[1-e^{-S_0/S}]$.

For a point that falls after the first branch point, a two-term factor may be used for the model, as follows:

$$S[1-e^{-S'/S}]+a_k*S[1-e^{-(S_0-S')/S}] \qquad [1\text{-}17]$$

The first of the two terms is similar in form to the term used for the radial model. However, the S' in the first term is equal to the distance from the substation to the first branch point. As shown above, the second of the two terms is added to the first term and is similar to the first term but with two differences. The first difference is that there is a term $a_k$ that acts as a multiplier. The term $a_k$ represents the split of the current at the first branch point and may be a value between 0 and 1. For example, in a two branch feeder circuit, $a_1$ and $a_2$ are indicative of the split of current between the branches, with $a_1+a_2=1$. The second difference is the term $(S_0-S')$ in the exponent. $S_0$, as discussed above, is an indication of the location of the particular demand response point along the feeder circuit (e.g., the electrical distance of a particular customer from the substation). And, S' is the distance from the substation to the branch point. So, for a demand response point at the branch point, $S_0=S'$, so that the second term is zero and the weighting factor $S[1-e^{-S'/S}]$. As one moves down the branch, the second term is given more weight to account for losses as the current travels down the branch.

Moreover, downstream of the first branch point may be a second branch point. This process may be repeated, but with a third term as represented by the following:

$$S[1-e^{-S'/S}]+a_k*S[1-e^{-(S''-S')/S}]+b_k*S[1-e^{-(S_0-S'')/S}]$$

where S" is the distance from the substation to the second branch point, and where S' is the distance from the substation to the first branch point, as discussed above. Further, the term $b_k$ represents the split of the current at the second branch point and may be a value between 0 and 1. As shown, additional terms may be added to the weighting factor to account for each successive branch down the feeder circuit.

And, the weighting factor may account for dynamic feeder circuit arrangements. Specifically, the topology of one or more feeder circuits may dynamically change depending on the state of the grid. For example, multiple feeder circuits (e.g., feeder circuit A and feeder circuit B) may have an inter-tie switch and sectionalizing switches. Depending on the switch states of certain switches (such as the inter-tie switch and/or the sectionalizing switches), sections of the feeder circuits may belong to feeder circuit A or feeder circuit B. The grid structure component may account for the states of the one or more switches in order to determine the weighting factors for customers on feeder circuit A or feeder circuit B. In particular, the Sub VPP Allocation System 108 may receive the current grid state, indicating the sections of the feeder circuits that belong to a particular feeder circuit. The weighting factor for the particular feeder circuit may then be determined based on the sections that currently belong to the particular feeder circuit. In this way, the model may account for the different configurations of the feeder circuits.

As discussed above, the demand response model can select which customers for demand response, select an amount of demand response, and select a length of time for the demand response. With regard to amount of demand response, customers in the pool of available demand response customers may have different amounts of demand response capacity. For example, a first customer may have a first set of appliances that are subject to demand response (such as a large size water heater). A second customer may have a second set of appliances that are subject to demand response (such as a small size water heater). Systems may determine what demand response capacity is available for a particular customer. This determination of demand response capacity may be based on a forecast, estimating what appliances may be operating at a given time. Or, this determination of demand response capacity may be based on actual real-time measurements.

The selection of the amount of demand response capacity may be determined in several ways. One way is to select a maximum amount of capacity from the highest ranked customer, then the next highest customer, and so on until the dispatch is satisfied (e.g., the 150 MWatts of demand response requested from the VPP optimization system 104, as described above). Another way is to take a proportional amount. For example, a number of customers subject to the demand response may be determined, and then a proportional amount of demand response may be taken from each of these customers.

With regard to how long, the same period of demand response may be set for all of the customers subject to demand response. The period for the demand response may be a predetermined length, such as 15 minutes, 30 minutes, and/or 1 hour. However, different periods may be set for different customers.

The demand response system may be subject to rules as to whether a particular customer is available for DR capacity. For example, a particular customer may be subject to a limited number of DR in a predetermined period (such as 2 times in a 24 hour period). The demand response model may account for these rules by reflecting this in the available DR capacity. Specifically, if the particular customer, according to the rules, is subject to DR, the particular customer's available DR capacity may be indicated by that which is forecasted. If the particular customer is not subject to DR (such as the particular customer has already been subjected to DR for the maximum number of times in the predetermined period), the particular customer's available DR capacity may be indicated as zero, reflecting that the particular customer is not subject to DR.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

For example, the computer-readable medium as discussed above may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The invention claimed is:

1. In a power grid comprising at least one feeder circuit, a method for reducing loss in the feeder circuit comprising:
   determining both grid structure of at least a part of the feeder circuit and current for the at least a part of the feeder circuit; and
   based on determining both the grid structure of the at least a part of the feeder circuit and the current in the at least a part of the feeder circuit, selecting at least one customer on the feeder circuit for demand response in order to reduce the loss in the feeder circuit,
   wherein determining both the grid structure and the current for the at least a part of the feeder circuit comprises using a model that provides an indication of the grid structure for the at least a part of the feeder circuit,
   wherein the model that provides an indication of the grid structure is based on electrical distance of the at least a part of the feeder circuit from a substation,
   wherein the model comprises a weighting factor based on the electrical distance of customers from the substation,
   wherein the model comprises $S[1-e^{-S_0/S}]$,
   wherein S characterizes resistance as a function of distance for the feeder circuit, and
   wherein $S_0$ comprises the electrical distance from the substation for customers in the feeder circuit.

2. The method of claim 1, wherein the model is further based on an indication of the current in the at least a part of the feeder circuit.

3. The method of claim 2, wherein the model is based on the current from the substation to the feeder circuit.

4. The method of claim 3, wherein the weighting factor for the customers in the feeder circuit is combined with the current from the substation in order to select the at least one customer, from the customers in the feeder circuit, for the demand response.

5. In a power grid comprising at least one feeder circuit, a demand response management computer system for reducing loss in the feeder circuit comprising:
   a memory storing a model that provides an indication of the grid structure for at least a part of the feeder circuit, the indication being based on electrical distance of the at least a part of the feeder circuit from a substation; and
   a processor in communication with the memory, the processor operable to:
      determine both grid structure of the at least a part of the feeder circuit and current for the at least a part of the feeder circuit,
      based on determining both the grid structure of the at least a part of the feeder circuit and the current in the at least a part of the feeder circuit, select at least one customer on the feeder circuit for demand response in order to reduce the loss in the feeder circuit, and
      send at least one instruction for the demand response for the selected at least one customer,
   wherein the processor operable to determine both the grid structure and the current for the at least a part of the feeder circuit comprises the processor operable to use the model stored in the memory, and
   wherein the model comprises a weighting factor based on the electrical distance of customers from the substation.

6. The demand response management computer system of claim 5, wherein the model comprises $S[1-e^{-S_0/S}]$,
   wherein S characterizes resistance as a function of distance for the feeder circuit, and
   wherein $S_0$ comprises the electrical distance from the substation for customers in the feeder circuit.

7. The demand response management computer system of claim 6, wherein the model is further based on an indication of the current in the at least a part of the feeder circuit.

8. The demand response management computer system of claim 7, wherein the model is based on the current from the substation to the feeder circuit.

9. The demand response management computer system of claim 8, wherein the processor is operable to combine the weighting factor for the customers in the feeder circuit with the current from the substation in order to select the at least one customer, from the customers in the feeder circuit, for the demand response.

* * * * *